(No Model.)
T. R. HYDE, Jr.
GLOVE FASTENER.
No. 436,137.              Patented Sept. 9, 1890.
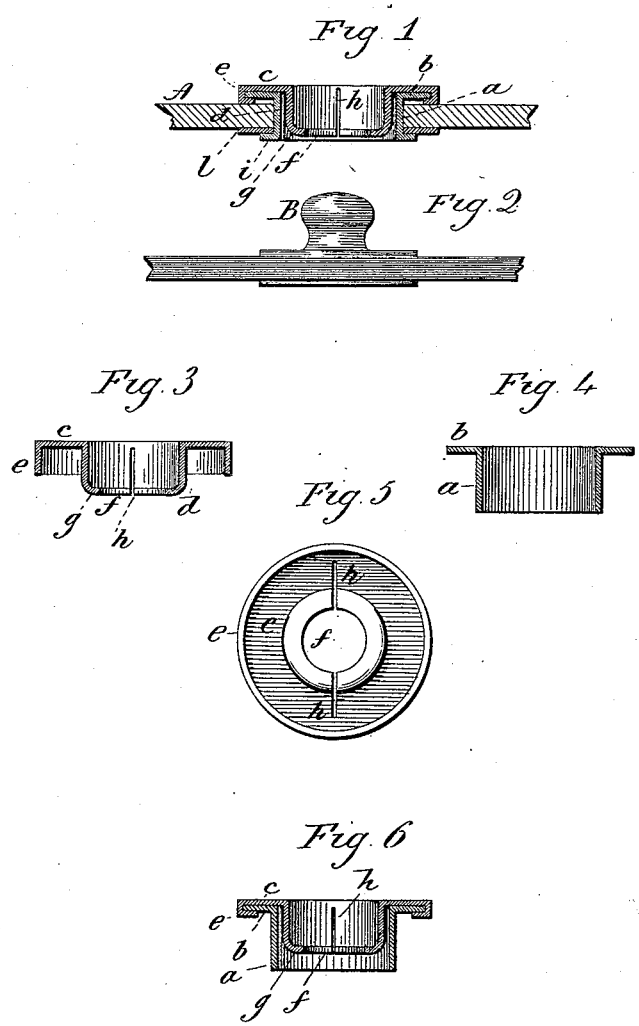
Witnesses
J. H. Shumway
Lillian D. Kelsey
Theophilus R Hyde Jr
Inventor
By Atty's
Earle & Seymour

UNITED STATES PATENT OFFICE.

THEOPHILUS R. HYDE, JR., OF WATERBURY, CONNECTICUT, ASSIGNOR TO THE SCOVILL MANUFACTURING COMPANY, OF SAME PLACE.

GLOVE-FASTENER.

SPECIFICATION forming part of Letters Patent No. 436,137, dated September 9, 1890.

Application filed January 20, 1890. Serial No. 337,466. (No model.)

*To all whom it may concern:*

Be it known that I, THEOPHILUS R. HYDE, Jr., of Waterbury, in the county of New Haven and State of Connecticut, have invented a new Improvement in Glove-Fasteners; and I do hereby declare the following, when taken in connection with accompanying drawings, and the letters of reference marked thereon, to be a full, clear, and exact description of the same, and which said drawings constitute part of this specification, and represent, in Figure 1, a central section of the socket member as attached to one flap of the glove; Fig. 2, the stud member as attached to the other flap of the glove; Fig. 3, a vertical section of the socket-disk detached; Fig. 4, a vertical section of the eyelet detached; Fig. 5, an inside view of the disk C, showing inner end view of the socket; and Fig. 6, a vertical section of the two parts forming the complete socket member.

This invention relates to an improvement in that class of glove-fasteners which consist of a button-like stud as one member adapted to be attached to one flap of the glove and a corresponding socket as the other member secured to the other flap of the glove, the socket being adapted to set onto the head of the stud, it being constructed with a yielding portion to permit the entrance of the stud and so as to yieldingly grasp the stud when the parts are set together. In some cases the socket is of tubular shape, the interior corresponding to the exterior of the head, the tubular socket having an inwardly-turned flange, so as to leave an opening into the socket somewhat less in diameter than the head of the stud, this tubular portion split in the plane of the axis, so as to give to it such a degree of elasticity that the head of the stud may be readily forced into the socket, separating the parts in doing so, the reaction of the elastic parts causing them to return and grasp the stud under the head, but yet so as to yield readily for the withdrawing of the head.

It is to this class of fasteners that my invention particularly relates, the object being to construct the socket member in a simple, cheap, and durable shape; and it consists in the construction as hereinafter described, and particularly recited in the claim.

The socket member is composed of two parts: first, the eyelet by which it is secured. This eyelet is a tubular shank $a$, (see Fig. 4,) with an outwardly-projecting annular flange $b$ at one end, substantially as in the usual construction of eyelets, the length of the tubular shank being greater than the thickness of the flap to which it is to be attached. The second part consists of a disk $c$, having a central tubular socket $d$ struck therefrom, the diameter of this tubular socket being somewhat less than the diameter of the shank $a$ of the eyelet. The disk $c$ is constructed with a concentric flange $e$ projecting therefrom on the same side as the socket $d$, and as clearly seen in Fig. 3, the interior diameter of this flange $e$ corresponding substantially to the external diameter of the flange $b$ of the eyelet. The internal diameter of the socket portion $d$ corresponds to the external diameter of the head of the stud member. The end of the socket has an opening $f$ through it, of a diameter less than the diameter of the head of the stud member, and so as to leave an internal flange $g$ around the inner end of the socket. The tubular socket is split, as at $h$, preferably, at two opposite points, as seen in Fig. 5, the slits being radial. These slits dividing the socket permit the parts of the socket to separate to some extent, and being elastic the parts so separated will return when left free so to do.

The parts are assembled by placing the flange $b$ of the eyelet within the flange $e$ of the socket portion, and then the flange $e$ is closed down upon the flange $b$, as seen in Fig. 6, which firmly unites the two parts and completes the socket member. The socket member is applied as seen in Fig. 1, the shank of the eyelet being passed through the flap A of the glove and so as to bring the combined flange of the socket close upon one surface of the flap, and then the end of the eyelet closed down upon the reverse side of the flap, as at $i$, Fig. 1, preferably employing a collar $l$ to close the shank of the eyelet upon. The stud member B is represented in Fig. 2 as attached to its flap C of the glove, and so that the head of the stud member may enter the socket, the socket yielding for the passage of the head through the opening $f$, and then reacting grasps the stud member around its neck, the elasticity of the socket permitting the stud to be readily withdrawn as occasion requires and as in other glove-fasteners of this class. By this construction the socket member is produced complete in two parts only, and is therefore extremely cheap, simple, and is also durable, the socket being fully protected by its position within its attaching-eyelet.

The setting of the shank of the eyelet upon the reverse side of the flap may be produced in the usual method, and any of the usual collars may be employed therewith.

I claim—

The herein-described socket member of a glove-fastener, consisting of a flanged eyelet $a\ b$, a disk $c$, constructed with a socket $d$, concentrically projecting therefrom, the external diameter of the socket less than the internal diameter of the shank of the eyelet, the said socket portion $d$ of an internal diameter somewhat greater than the head of the stud member and constructed with an internal annular flange $g$ around its inner end, the internal diameter of the flange being somewhat less than the diameter of the head of the stud, the socket portion radially slit and the disk constructed with a flange $e$ around its outer edge, the eyelet set upon said disk, the tubular shank around the said socket portion, the flange $b$ upon the disk within the flange $e$, and the flange $e$ of the disk closed upon the flange $b$ of the eyelet, substantially as described.

THEOPHILUS R. HYDE, JR.

Witnesses:
JAMES H. PILLING,
M. L. SPERRY.